March 3, 1959     R. T. PRING     2,875,844
METHOD AND APPARATUS FOR THE REMOVAL OR
RECOVERY OF VAPORS FROM AIR
Filed March 21, 1957

INVENTOR.
ROBERT T. PRING
BY
Owens, McDougall, Williams & Hersh
Attorney

United States Patent Office 2,875,844
Patented Mar. 3, 1959

2,875,844

METHOD AND APPARATUS FOR THE REMOVAL OR RECOVERY OF VAPORS FROM AIR

Robert T. Pring, South Bend, Ind., assignor to Wheelabrator Corporation, Mishawaka, Ind., a corporation of Nebraska Application March 21, 1957, Serial No. 647,644

13 Claims. (Cl. 183—4.3)

This invention relates to the processing of air or other gaseous medium to remove contaminating or other vapors present in the air, and it relates more particularly to a method and apparatus for effectively removing vapors from air or other gaseous medium for purification of the air or other gaseous medium or for recovery of the vapor which is present in the air or other gaseous medium.

It is an object of this invention to provide a new and improved means and method for the removal or recovery of vapors from air or other gaseous medium, and it is a related object to provide a method and means of the type described which is substantially free of the limitations characterizing vapor removal processes and equipment heretofore employed and which is effective for removal of vapors even when present in low concentrations as well as in high concentrations in the air or other gaseous medium.

These and other objects and advantages of this invention will hereinafter be set forth and for purposes of illustration, but not of limitation, an embodiment of the invention is shown in the accompanying drawing, in which—

Figure 1:
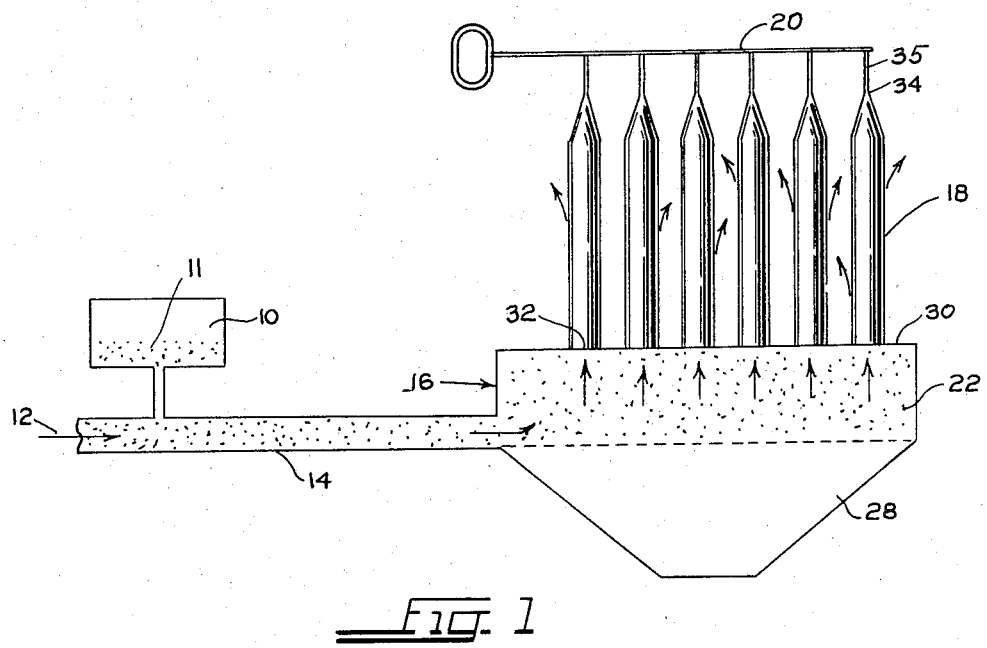
Figure 2:
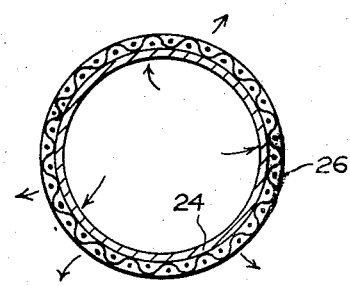

Figure 1 is a pictorial flow sheet of a system embodying the features of this invention; and Figure 2 is a sectional view through a filter unit employed in the practice of this invention.

Since, in most instances, the atmosphere treated will consist of air contaminated with the vapors to be removed, the specification and claims will hereinafter refer to air as representative of the gaseous medium. It will be understood, however, that other gases such as oxygen, nitrogen and the like may be included.

To the present, use has been made commercially of adsorption systems for the removal of certain vapors from air wherein activated carbonaceous materials have been employed as the adsorptive medium. Such activated carbonaceous materials, in the form of relatively large or coarse particles, have been formed into reactor beds in packed columns or towers through which the air is passed to bring the vapors into contacting relation with the activated carbonaceous material for removal from the air by adsorption.

Columns packed with beds of activated carbonaceous material have been used quite successfully for the removal of contaminating vapors from air. The principal objection to their use stems from the static character of the system which limits its application and use. In adsorption towers, one or more beds are packed with the relatively large particles of the activated carbonaceous material. The contaminated air is forced through the packed column. The contaminating vapor or gas is adsorbed almost immediately upon engagement with the adsorbent surface of the activated carbonaceous material so that adsorption is rapid at first but then slows down as the surface portions of the activated carbonaceous material become satisfied or saturated with the vapor. In addition, the adsorbing action progresses from the area of the bed first contacted to the point of exit from the bed as the first portions progressively become satisfied or saturated in use.

The adsorption process is exothermic in that heat is given off. Because of the static character of the beds, dissipation of heat which is generated becomes necessary, otherwise a reversal of the adsorption reaction becomes possible. Some systems provide for the addition of water vapor to the air forced through the bed for temperature control, while others wet the activated carbonaceous material. Either is undesirable because of the interferences which are established with the normal adsorption process and the ability to make maximum use of the adsorption material.

Because of the static nature of the packed beds of activated carbonaceous material, when the beds become somewhat saturated to the extent that they are incapable of removal of the desired amounts of vapor from the air, as when the bed reaches the "break through" point, it becomes necessary to replace the activated carbonaceous material. Regeneration, as by removal of the spent adsorbent and repacking of the tower with the activated carbonaceous material, represents a time-consuming and laborious operation which makes it necessary to provide for a duplicate set of equipment so as to have one available for placement into the system while the other is being repacked for use. Because of the relatively high cost of packed towers and because of the necessity for duplication of equipment, systems which make use of towers packed with activated carbonaceous material have been impractical from the standpoint of cost as well as efficiency.

Further, packed adsorption towers of the types heretofore employed have been restricted in their use to the treatment of relatively small amounts of air or other gaseous material. Large amounts of air cannot efficiently be processed through packed towers because of the large pressure drop which occurs across the packing. This necessitates the use of large amounts of power to force the air through the beds. This volumetric limitation imposes a restriction with respect to the ability to make effective and efficient use of packed towers where the vapor to be removed is present in the air in low concentrations or wherein large amounts of air or other gaseous media are to be treated. Thus, packed towers are incapable of practical use in the treatment of exhausts from processing equipment where the vapors might be present in the exhaust in concentrations as low as 75 parts per million or even 400 parts per million.

A further objectionable feature in the use of packed columns as a dry scrubber for the removal of vapors resides in the inflexibility of the system. This is because the system is static, as previously described, since the adsorbent operates at the same level of efficiency for the extraction of vapors until such time as the adsorbent becomes satisfied in its reactive portions. This is identified in the trade as the "break through" point. Break through occurs more frequently with systems in which the vapor is present in large concentrations. When break through occurs, the level of efficiency of the unit falls off rapidly to the extent that it becomes necessary to take the tower off stream for regeneration of the adsorbent.

These same objectionable characteristics are to be found also in fluid bed reactors wherein the carbonaceous materials in the bed are agitated by the entering contaminated gas stream so that the aerated mass has a tendency to behave more as a fluid. As in the static beds of packed columns, the carbonaceous particles remain in place. These fluid type reactor beds share the disadvantages of packed towers from the standpoint at least of high pressure loss, expense of equipment and the necessity to duplicate the equipment to permit regeneration.

It has been found that vapors can be effectively and efficiently removed from air when present in concentrations greater than 500,000 parts per million or when present in such low concentrations as 75 parts per million by the combination of steps which includes (1) the introduction of activated carbonaceous material or other solid adsorbent in finely divided form into the air stream for direct dispersion into the air stream contaminated with the vapors to be removed, and (2) the passage of the contaminated air stream, containing the dispersed particles of adsorbent material, through a filter surface on which the particles of adsorbent are separated from the air to form a permeable layer through which oncoming air must pass before being exhausted to the atmosphere, thereby to bring the vapors remaining in the air into intimate contacting relation with freshly deposited, unsaturated, or partially unsaturated adsorbent capable of efficient removal of vapor from the air stream.

The activated carbonaceous material dispersed as fine particles in the air provides a fluid system capable of bringing the finely divided adsorbent particles into intimate contacting relation with the vapors that are to be removed from the air. Because the finely divided particles of carbonaceous material dispersed in the air provide a tremendous amount of surface area per unit weight by comparison with the coarse particles of carbonaceous material in the static beds of the contact towers, the greatest proportion of the vapors to be removed from the air will be taken up by adsorption almost immediately while the activated adsorbent is still dispersed as fine particles in the air. The remainder, or at least substantial portions of the remainder of the vapors in the air, will be removed by the subsequent intimate contacting relation between the vapors and the activated carbonaceous or other adsorbent material as the air is caused to filter through the porous and permeable layer of finely divided adsorbent lining of the filter fabric. By the combination of steps described, better than 95% and more often 100% removal can be effected with less power consumption and with negligible pressure drop by comparison with the pressure drop experienced through the static layers of coarse particles of carbonaceous material employed in packed towers. Thus the process embodying the features of this invention is applicable to the treatment of such large volumes of air as would be impracticable with packed towers and for the removal of contaminating vapors present in such low concentrations as would be incapable of effective treatment with packed towers.

In the practice of this invention, activated carbonaceous or other adsorbent material is continuously introduced into the air in an amount in excess of that capable of being saturated by the amount of removable contaminating vapors present in the air. It is preferred to make use of a substantial excess of the adsorbent, such as an amount greater than two times the weight of the adsorbing reagent capable of being saturated by the contaminating vapors and preferably in an amount which is from four to ten times greater than the amount capable of being satisfied by the contaminating vapors present in the air.

Any gas or vapor capable of being adsorbed in conventional beds of activated charcoal can be removed from air or other gaseous media by the process described. This includes almost any organic compound which can exist at normal temperature in a gaseous or vapor phase. Where the adsorbent is to be reactivated for use, or when the vapor is to be recovered, use can be made of the described process to recover vapors which, under the conditions existing in the regeneration or recovery, do not break down to form a relatively non-volatile solid having viscous or adhesive properties. Solvent vapors, whether aliphatic, cyclic or heterocyclic, can be removed, including alcohols, ethers, aldehydes, ketones, esters, and certain organo-metallic compounds and derivatives thereof. The process described can be used effectively to remove organic compounds that produce objectionable odors, such as mercaptans, gaseous or vapor phase decomposition products of animal or vegetable origin; halogenated hydrocarbons; hydrides or oxides of certain inorganic compounds and metals including hydrogen sulfide, phosphine, sulphur dioxide and the like. It will be understood that the efficiency of adsorption will vary somewhat inversely with the molecular weight of the particular material in a given class. Thus, high boiling organic substances may be more readily adsorbed than some of the low boiling materials or derivatives.

As the adsorbent material, it is preferred to make use of activated carbonaceous materials, as represented by activated charcoal from wood products, activated carbon from coal or petroleum products, or other conventional adsorbent activated carbonaceous material. Though not equivalent, use can also be made of activated alumina and silica gel as the finely divided adsorbent particles dispersed in the air stream for remvoal of vapors, both organic and inorganic. For example, activated alumina is effective in the removal of inorganic gaseous compounds such as sulphur dioxide and the like. For dispersion in the air stream, it is desirable to make use of adsorbent material reduced to a particle size capable of being suspended in and conveyed by the flowing gaseous or air stream. In practice, use can be made of activated carbonaceous or other adsorbent material reduced to a particle size which is minus 200 mesh and preferably minus 200 and plus 325 mesh.

With reference to the dispersion of the finely divided particles of adsorbent material in air, it will be apparent that heat generation, which represents a problem of dissipation in the static beds in packed columns, will not present a barrier to the use of a fluid system of the type described because the dilution of the finely divided particles of adsorbent material, separately dispersed in the air, will enable heat of adsorption to become immediately dissipated into the air stream to be carried away by the air. Thus, without the static heat-insulating characteristics of the packed column, temperature build-up is incapable of taking place where admixture of the type described exists or where heat of adsorption takes place while the particles are separately dispersed in the air and where large volumes of air are present by comparison with the amount of adsorbent material.

Another important factor in the improvement of the adsorption process by the system described resides in the relatively large amount of surface area available per volume of weight of the finely divided adsorbent material, as distinguished from the considerably smaller amount of surface area available in an equivalent weight of adsorbent material employed in static systems characteristic of packed towers or reactor beds. As a result, the amount of adsorbent material for removal of an equivalent amount of vapor from the air is considerably less in the system described as compared with the packed towers or reactor beds heretofore employed. Similarly, maximum use can be made of the finely divided materials as an adsorbent whereby more efficient use can be made of the adsorbent materials employed in the system described herein.

A further important concept resides in the greater flexibility which characterizes the process forming the subject matter of this invention. With reference to the systems which make use of static beds of adsorbent material, adsorption at a relatively high rate remains constant until the adsorbent material forming the bed becomes saturated with the vapors extracted. When saturation or break through is reached, the efficiency of the unit falls off materially to the extent that the tower or bed becomes unfit for further use. At this point, the tower is taken off stream for regeneration of the adsorbent.

A similar break through point will not be reached in the process forming the subject matter of this invention because an amount of finely divided adsorbent material is continuously being introduced into the air which is in excess of the amount required for adsorbing all of the vapors available in the air, and preferably more than twice the amount capable of being saturated by the amount of vapor in the air. As a result, a saturation point similar to that reached in the static systems heretofore employed is avoided and maximum adsorption efficiency is constantly maintained throughout the cycle.

An important concept of this invention resides in the fact that only a shallow deposit of adsorbing material is required on the filter surface because the exposed portions are always in an active state and are constantly being replaced by fresh or partially saturated adsorbing material especially when coupled with the condition whereby much of the adsorption has already occurred in earlier parts of the flue system.

With reference to the finely divided adsorbent which is filtered from the air stream to form the porous layer through which the contaminated air is filtered, the characteristics of the thin permeable layer of finely divided adsorbent materials built up on the surface of the filter fabric provide very little resistance to gaseous flow whereby pressure drop through the filter system is insignificant by comparison with the pressure drop that takes place when an equivalent amount of contaminated air is processed through a packed column of adsorbent material. In a system embodying the practice of this invention, a pressure drop of 7 inches of water is usually the maximum which will be experienced in the treatment of air as compared to a pressure drop of 20 inches of mercury secured in the treatment of air at an equivalent rate in a packed column.

Because of the finely divided character of the adsorbent material, the layer that is formed is highly permeable and offers little resistance to the flow of air therethrough. In general, it is preferred to operate the system until a thickness sufficient to cause excessive pressure drop is reached. With some systems such conditions may be reached at about ½ inch. Because the amount of adsorbent material introduced initially into the air is more than enough to satisfy the vapors in the air, and because such finely divided adsorbent material is constantly being deposited to form a part of the built-up porous layer in the same ratio described as between the adsorbent and the vapors in the air, the permeable layer that is formed is always capable of extracting vapors from the system to the end that a break through point, characteristic of packed towers, will be incapable of being reached in the system described.

Referring now to the pictorial representation of the flow of materials, the numeral 10 represents a receptacle containing particulate adsorbent material 11 adapted to be introduced at a desired rate into a passage 14 through which the contaminated air 12 is caused to flow from a piece of process equipment to a filtration device 16. The particulate adsorbent 11 is introduced into the passage 14 in the desired amount for dispersion with the contaminated air stream. In general, uniform dispersion occurs automatically at air velocities sufficient for conveyance. If desired, additional means may be embodied within the passage for causing turbulent flow to enhance the dispersion or for maintaining the dispersed phase, or a dispersion chamber or other means may be employed for effecting uniform distribution of the adsorbent particles 11 in the contaminated air 12 during the remainder of travel with the air through the passage 14 to the filtration device.

Use can be made of any conventional filtration device having a porous filter surface through which the volume of air can flow without noticeable pressure drop but it is preferred to make use of a bag type filter having a high proportion of filter surface area, such as is described in the issued Patents No. 2,137,254 and No. 2,143,664. The filter device, illustrated by the numeral 16, is formed with an inlet plenum chamber 22 having an inlet at one end through which the contaminated air is introduced from the passage 14. The top wall 30 of the inlet plenum chamber is formed with a plurality of openings 32 in communication with the ends at the bottom of a plurality of filter tubes 18 formed of a filter fabric 26. The tubes 18 are closed at the top 34 and suspended from hanger rods 35. The latter are connected for rocking movement onto a shaker bar 20 for agitation of the bags to loosen particulate substances collected as a layer 24 on the inner walls thereof. Thus, the collected material is removed from the walls of the filter tubes when the thickness of the layer 24 becomes excessive to cause noticeable increase in the pressure drop across the filter section. Agitation of the filter tubes for removal is effected while the air flow is cut off to permit the dry particulate substances to fall gravitationally downwardly through the inlet plenum chamber 22 to a collecting hopper 28 where the particulate material is gathered for further processing as by treatment to recover the vapor or to regenerate the adsorbent material, or both. Instead, the adsorbent can be cleaned from the surfaces of the filter tubes by a reverse jet principle, i. e. by reversing the flow of air through the tubes. The filter tubes are preferably arranged in separated compartments for enabling continuous and automatic operation with but a single unit, flow taking place through the tubes in only a part of the compartments while the others are being prepared for placement on stream.

The filter tubes 18 are preferably formed of conventional textile materials, such as cotton, but they may also be formed of synthetic fibers of organic polymeric materials, or glass, having higher strength than natural fibers and more resistance to the vapors which might be brought into contact therewith. In addition, such synthetic fibers can be employed where it is desirable to have a higher degree of thermostability, thereby to enable use of the device in the treatment of contaminated air at elevated temperature.

When the accumulation of adsorbent particles on the ingoing side of the filter fabric is such as to cause excessive pressure drop during passage of the air across the composite layers, the operation of one portion of the filter can be stopped to shake down the tubes while operation continues in another portion of the multiple compartment filter unit. When such means are provided for sequential operation of portions of the filter device, for cleaning one portion when another is in operation, a system for the continuous treatment of air for the removal of contaminating vapors and gases is provided.

It will be apparent further, by way of still another advantage, that removal of the vapor from the air or other gaseous medium can be caused to take place efficiently and effectively without the pressure drops characteristic of packed towers or reactor beds. Thus, the power requirements for a system embodying the features of this invention will be much less than those which are required for the static systems heretofore employed. As a result, considerably larger volumes of air or other gaseous medium can be economically treated in a continuous operation, thereby to permit the process described to be used in commercial applications where the amount of contaminant may represent a small proportion, such as less than 70 parts per million of the air by weight.

The spent adsorbent material removed from the filter tubes can be regenerated by a batch process of treatment, but it is preferred, especially in combination with the continuous process, to make use of a continuous regeneration system wherein the adsorbed material is eliminated and the regenerated adsorbent material either cooled or dried for return in a continuous cycle for redispersion in the contaminated air. Regeneration can be accomplished by exposing the adsorbent to steam, as by passing wet steam through the spent adsorbent, or it can be regenerated by heating the adsorbent to an elevated temperature while making use of a slow stream of air or inert gas to carry away the released organic vapors.

Where the organic vapors removed are of economic value or otherwise useful, the concentration of the organic vapors released or the manner in which the organic vapors are released can be selectively controlled to permit economical recovery. Where recovery is impractical or uneconomical, the organic vapors can be destroyed by combusition, catalytic combustion or other means. Processes for the recovery of solvent vapors and other organic vapors from spent adsorbent are well known. These include the processes of condensation, water scrubbing, or adsorption by scrubbing with compatible liquids.

By way of illustration, in the removal of xylene vapors present in a concentration averaging about 440 parts per million, the contaminated air was treated by introducing activated carbon (plus 325 mesh—minus 200 mesh) into the air stream in a concentration of about 30 pounds of carbon per 1 pound of xylene vapors contained in the air. The activiated carbon was introduced into the contaminated air stream 12 during travel through the passage 14 for dispersion of the particles with the air. The contaminated air with the dispersed particles of activated carbon was then filtered through a bag house filter 16 having an air-to-cloth ratio of 3.7 cubic feet of air per minute to 1 square foot of filter surface. The bag house was operated on a 7½ minute cycle with ½ minute between shake-downs.

In operation, a pressure increase of 1½ inch water gauge was secured across the composite filter layers and practically 100% removal of the xylene vapors was effected. The dispersion of adsorbent particles in the air was maintained for less than 1 second before the contaminated air entered the bag house.

In another operation, air containing 765 parts per million of solvent vapors was treated in substantially the same manner with activated carbon of the described mesh size introduced into the contaminated air in amounts of about 11 pounds per pound of solvent vapors contained in the air. The contaminated air was passed through the filter surface at the rate of 4.2 cubic feet per minute per square foot of filter cloth. A pressure increase in the range of 1.7 inch water gauge was secured with better than 85% removal of vapors. The treatment of an equivalent amount of air through a packed tower for equivalent removal would have caused a pressure increase in the order of 22 inches of water through the reactor bed. In the practice of this invention, the bag house was divided into two compartments, each one alternately operating on a 7½ minute cycle with 7½ minutes shutdown between cycles, of which 38 seconds was consumed in shaking the filter bags.

It will be apparent from the foregoing that I have provided a new and improved process for the removal or recovery of vapors present as a contaminant in air or other gaseous medium in low as well as in high concentration, such as in concentrations ranging from less than 70 or less than 440 p. p. m. to as high as 50,000 p. p. m. The described process is free of most of the objectionable features present in static vapor removal systems which have heretofore been employed, and the process described is capable of use in a continuous operation for removal of vapors from air or other gaseous medium issuing constantly and at a relatively uniform rate from devices and reactions employed in the process industries. The process described further provides for continuous operation in regeneration of the adsorbent for return to the removal cycle.

In the description of the process reference has been made to air as the medium contaminated by the organic vapors. It will be understood that the term "air" will include other gaseous media which may have contaminating vapors admixed therein, and it will be further understood that changes may be made in the details of construction, arrangement, and operation without department from the spirit of the invention, especially as defined in the following claims.

I claim:

1. In the method of removing contaminating vapors from a gaseous system, the steps of introducing an activated adsorbent material in finely divided form into the gaseous stream containing the contaminating vapors and dispersing the particulate substance in the contaminated gaseous stream, and then passing the gaseous stream with the particulate substance distributed therein through a porous layer built up of the finely divided adsorbent material whereby the dispersed particles of adsorbent material having contaminating vapors adsorbed thereon are filtered out of the gaseous stream to form a part of the porous layer through which the gaseous stream must flow in intimate contact to enable removal of additional amounts of contaminating vapors therefrom.

2. In the method of removing contaminating organic vapors from air, the steps of introducing an activated carbonaceous material in finely divided form into the contaminated air stream and dispersing the particulate adsorbent material therein whereby some of the contaminating vapors are adsorbed by the particulate adsorbent dispersed in the air stream, and then passing the gaseous stream with the particulate adsorbent distributed therein through a permeable layer built up of the finely divided adsorbent whereby the dispersed particles of adsorbent having contaminating vapors adsorbed therein from the contaminated air during travel therewith are filtered out of the air stream to form a part of the porous layer through which subsequent portions of the air stream must flow in intimate contact to enable removal of additional amounts of contaminating vapors therefrom.

3. The method as claimed in claim 1 in which the dry particulate substance is dimensioned to have a particle size less than 200 mesh.

4. The method as claimed in claim 1 in which the dry particulate substance is introduced into the gaseous stream in an amount not less than that theoretically required to adsorb the contaminating vapors in the air stream.

5. The method as claimed in claim 4 in which the particulate substance is introduced into the air in an amount at least twice the theoretical amount.

6. The method as claimed in claim 1 which includes the additional steps of stopping the flow of contaminated gaseous medium through the built up layer on the filter surface at intervals when the built up layer of particulate adsorbent offers increased resistance to gaseous flow, removing the particulate substance from the built up layer on the filter surface, and then adding additional amounts of particulate substance to the gaseous stream immediately to reform layers of particulate adsorbent on the surface of the filter for subsequent flow.

7. Means for the removal of organic vapors present as a contaminant in a gaseous medium comprising a housing having an inlet at one end and an outlet at another, filter elements within the housing arranged in the path of gaseous medium passing therethrough so as to cause the gaseous medium to pass through the filter elements when traveling from the inlet to the outlet, a passage in communication with the inlet to the housing for introducing the gaseous medium contaminated with the organic vapors into the housing, means for causing the gaseous medium to travel through the passage in turbulent flow to the inlet of the housing, means for introducing a dry particulate adsorbent material into the passage for suspension in the contaminated gaseous medium during travel through the passage whereby the particulate substance becomes suspended in the gaseous stream for the removal of organic vapors coming in surface contact therewith, said means being characterized by the fact that the particulate adsorbent material suspended in the gaseous medium becomes separated on the ingoing side of the filter element to form a permeable layer through which the contaminated gaseous medium must pass in intimate contacting relation, and means for intermittently removing the layer of particulate substance built up on the ingoing side of the filter element.

8. Means as claimed in claim 7 which includes the built up layer of adsorbent particles on the ingoing side of the filter element and in which the built up layer is of a thickness less than that to cause excessive pressure drop during passage of the gaseous medium thereacross.

9. Means as claimed in claim 7 in which the adsorbent material comprises an activated carbonaceous material.

10. Means as claimed in claim 9 in which the activated carbonaceous material is of a particle size of minus 200 to plus 325 mesh.

11. Means as claimed in claim 7 in which the filter element comprises a plurality of elongate filter tubes and in which the means for removing the layer of particulate substance collected on the ingoing side of the filter tubes comprises means for agitating the tubes with the gaseous stream cut off.

12. In the method of removing contaminating vapors from a gaseous system, the steps of introducing an active adsorbent material in finely divided form into the gaseous stream containing the contaminating vapors and dispersing the particulate adsorbent into the contaminated gaseous stream whereby the particulate adsorbent removes some of the contaminating vapors from the gaseous stream while dispersed therein and then passing the gaseous stream with the particulate substance dispersed therein through a porous layer built up of the finely divided adsorbent material whereby dispersed particles of the adsorbent material having contaminating vapors adsorbed therein are filtered out of the gaseous stream to form the outermost portions of the porous layer through which the gaseous stream must flow in intimate contact to enable additional removal of contaminating vapors therefrom, reversing the flow of the gaseous stream through the filter elements to remove spent adsorbent present in the formed layer, and then continuing the cycle as previously defined.

13. Means for the removal of organic vapors present as a contaminant in a gaseous medium as claimed in claim 7 in which the filter elements in the housing are divided in separate compartments some of which are on stream while others are off stream for regeneration so as to enable use of the filter housing in a continuous operation.

References Cited in the file of this patent

UNITED STATES PATENTS

| | | |
|---|---|---|
| 1,366,655 | Haslup | Jan. 25, 1921 |
| 2,411,208 | Hall et al. | Nov. 19, 1946 |
| 2,492,401 | Schutte | Dec. 27, 1949 |
| 2,747,681 | Schuftan et al. | May 29, 1956 |